United States Patent [19]
Aoki

[11] Patent Number: 5,438,359
[45] Date of Patent: Aug. 1, 1995

[54] ELECTRONIC CAMERA SYSTEM USING IC MEMORY CARD

[75] Inventor: Harumi Aoki, Tokyo, Japan

[73] Assignee: Asahi Kogaku Kogyo Kabushiki Kaisha, Tokyo, Japan

[21] Appl. No.: 122,234

[22] Filed: Sep. 15, 1993

[30] Foreign Application Priority Data

Sep. 16, 1992 [JP] Japan .................................. 4-270723

[51] Int. Cl.⁶ .............................................. H04N 5/30
[52] U.S. Cl. ................................... 348/207; 348/552; 348/231; 348/375; 358/906
[58] Field of Search ................... 348/61, 96, 231, 107, 348/552, 375, 202; 358/335, 906; 354/75, 76, 105, 106

[56] References Cited

U.S. PATENT DOCUMENTS

| | | | |
|---|---|---|---|
| 4,862,200 | 8/1989 | Hicks | 354/75 |
| 5,034,804 | 7/1991 | Sasaki et al. | 358/41 |
| 5,091,787 | 2/1992 | Watanabe et al. | 358/209 |
| 5,231,501 | 7/1993 | Sakai | 358/209 |

FOREIGN PATENT DOCUMENTS 0047177  2/1989  Japan ........................... H04N 5/225

*Primary Examiner*—Joseph Mancuso
*Assistant Examiner*—Bipin Shalwala
*Attorney, Agent, or Firm*—Kane, Dalsimer, Sullivan, Kurucz, Levy, Eisele and Richard

[57] ABSTRACT

An electronic camera system including a camera and an external computer. The camera includes an IC memory card, a data writing/reading circuit, an interface circuit, and a connector. The computer includes a connector which can be electrically connected to the connector of the camera, the computer being electrically connected to the IC memory card through the data writing/reading circuit and the interface circuit when the connector of the camera is connected to the connector of the computer.

11 Claims, 4 Drawing Sheets

ELECTRONIC CAMERA SYSTEM USING IC MEMORY CARD

BACKGROUND OF THE INVENTION

1. Field of the Invention

The present invention relates to a camera system including a computer and an electronic camera, such as a still video camera, in which image data is recorded on an IC memory card.

2. Description of Related Art

Recently, electronic cameras have been proposed in which an IC memory card is used as a recording medium to record data of photographed object images. A still video camera is an example of such an electronic camera. An image of an object taken by the still video camera is converted to an electrical signal by a CCD, for example, to obtain image data which can be recorded on an IC memory card by a writing/reading circuit. Examples of IC memory cards which can be used are; an EPROM card, an EEPROM card, a flash memory card, a RAM card, etc.

The image data recorded on the IC memory card consists of digital data, similar to data used in computers. Accordingly, it is possible to transmit image data to and receive image data from the computer. Consequently, the image data of an object photographed by an electronic camera and recorded on an IC memory card can be used as graphic data in a computer, such as a personal computer.

Moreover, it is possible to record file data or numerical data produced in the personal computer on the IC memory card. If the data is recorded on the IC memory card together with the image data, then the file data or numerical data could be effectively used to sort the image data.

SUMMARY OF THE INVENTION

The primary object of the present invention is to provide an electronic camera system which can effectively execute data communication between an electronic camera in which an IC memory card is used as a recording medium and a computer.

Namely, the present invention is aimed at the provision of an electronic camera system in which data can be read from or recorded on an IC memory card by an associated computer without providing an additional circuit or element therefor in the computer.

To achieve the object mentioned above, according to an aspect of the present invention, an electronic camera system is provided including a camera and and external computer. The camera includes an IC memory card in which image data of an object to be photographed can be stored, a data writing/reading circuit which writes data onto and reads data from the IC memory card, a computer interface circuit, and a connector for electrically connecting the camera to an associated computer. The computer includes a connector which can be electrically connected to the connector of the camera. The computer is electrically connected to the IC memory card through the data writing/reading circuit and the interface circuit when the connector of the camera is connected to the connector of the computer.

Preferably, the computer includes a recess in which the camera can be engaged, so that when the camera is engaged in the recess, the connector of the camera is connected to the connector of the computer.

According to another aspect of the present invention, an electronic camera system is provided including a camera in which image data can be recorded in an IC memory card, a computer which can be electrically connected to the camera and which can write data other than the image data onto the IC memory card, and a mechanism for stopping a photographing operation of the camera when the camera is connected to the computer.

Preferably, the camera and the computer have independent power sources. A switching mechanism is provided in the camera for switching the source of camera power supply from camera power source to the computer power source when the camera is connected to the computer.

According to still another aspect of the present invention, an electronic camera system includes a camera in which image data can be recorded in an IC memory card, and a computer which can write data other than the image data onto the IC memory card and read the image data recorded on the IC memory card. The camera is provided with a data writing/reading circuit which writes and reads data onto and from the IC memory card and a computer interface circuit. The computer is provided with a connector which can be electrically connected to the camera so that when the connector is connected to the camera the computer and the IC memory card are connected through the data writing/reading circuit and the interface circuit.

The present disclosure relates to subject matter contained in Japanese patent application No. 4-270723 (filed on Sep. 16, 1992) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
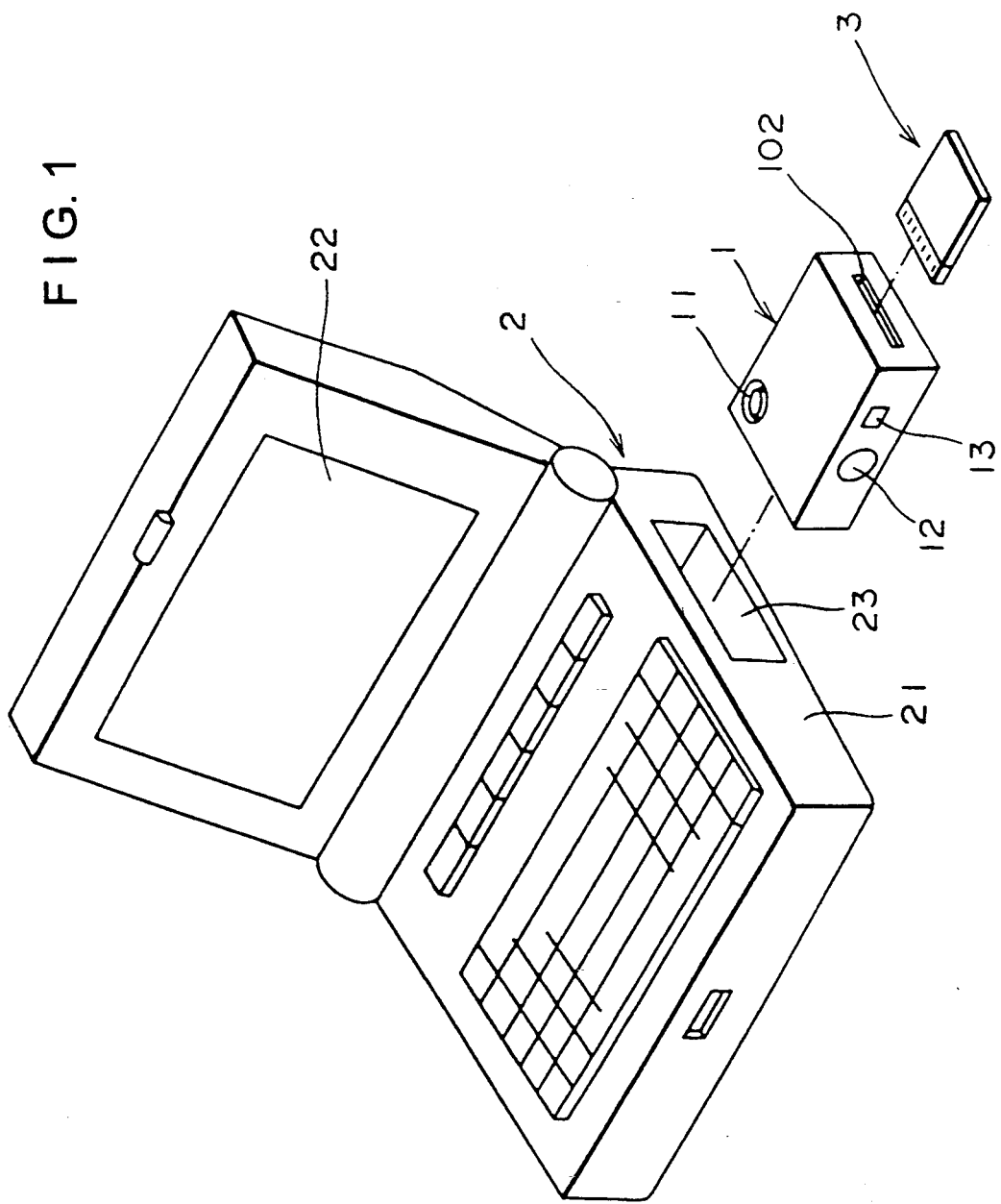
FIG. 1 is a schematic view of an electronic camera system according to the present invention.

FIG. 1 shows an electronic camera system according to an aspect of the present invention. In FIG. 1, an electronic camera system includes a small still video camera 1 and a computer (i.e., personal computer) 2. The still video camera 1, which is for example a small pocket size camera, is provided with a card opening 102 in which an IC memory card 3 is inserted. When a shutter button 11 is depressed, an image of an object photographed by a taking optical system 12 is converted to an electric signal to form image data which is then recorded on the IC memory card 3 in a predetermined format.

The personal computer 2 includes a computer body 21 with a key board and a display 22. The computer body 21 is provided with a recess 23, corresponding to the outer shape of the camera 1, in which the camera 1 can be inserted. The recess 23 serves as a connecting portion between the camera and the personal computer.

Figure 5:
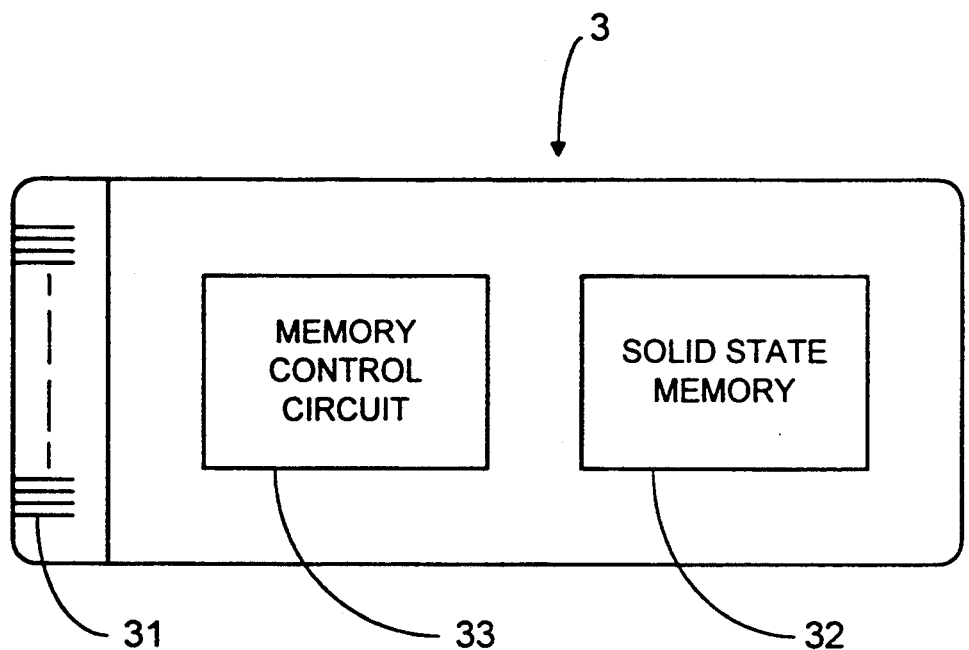

The IC memory card 3 can be a conventional card, as shown in FIG. 5, in which the memory card is provided on one end thereof with a connector 31 and contains therein a solid state memory 32 comprised of a ROM, RAM or flash memory, etc., and a memory control circuit 33.

Figure 2:
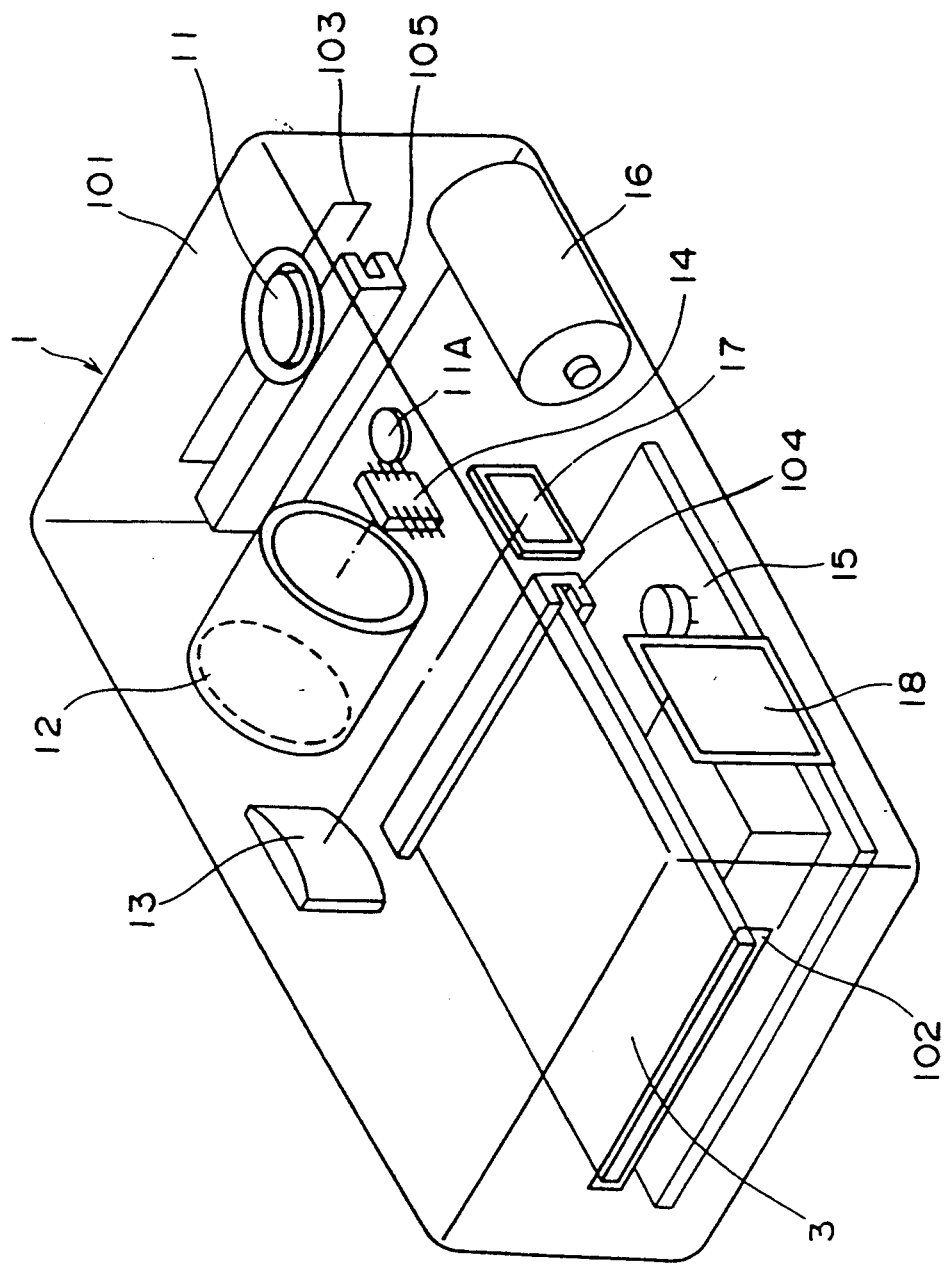
FIG. 2 is an isometric view of an electronic camera shown in FIG. 1.

FIG. 2 shows an internal structure of the camera 1. The camera case 101 is provided on one end thereof with the card opening 102 mentioned above, in which the IC memory card 3 can be inserted. The camera case 101 is provided on the other end thereof with a connector opening 103 in which a connector board 24 (FIG. 4) provided in the personal computer 2 can be inserted. A first connector 104 for the IC memory card is provided in the camera case 101 and corresponds to the card opening 102. When the IC memory card 3 is inserted in the card opening 102, the connector 31 of the IC memory card is electrically connected to the connector 104. Similarly, a second connector 105 for the personal computer is provided in the camera case 101 corresponding to the connector opening 103. When the camera 1 is inserted in the recess 23 of the personal computer 2, the connector board 24 of personal computer 2 is electrically connected to the second connector 105. The card opening 102 and the connector opening 103 of the camera 1 are normally closed by respective cover plates 106 and 107 (FIG. 4) and can be opened by the IC memory card 3 and the connector board 24 when the IC memory card 3 and the connector board 24 are inserted in the card opening 102 and the connector opening 103, respectively.

In the camera case 101, there are an image taking optical system 12, a finder optical system 13, and a picture pickup device 14, such as a CCD to convert the image taken by the image taking optical system 12 to electric signals, a circuit element 15, and a battery 16.

The camera case 101 is provided on the upper surface thereof with a shutter button 11, and other switches 11A (only one switch is shown), and on the rear surface thereof with a finder window 17 and an indicator 18. The indicator 18 can be an LCD, for example.

Figure 3:
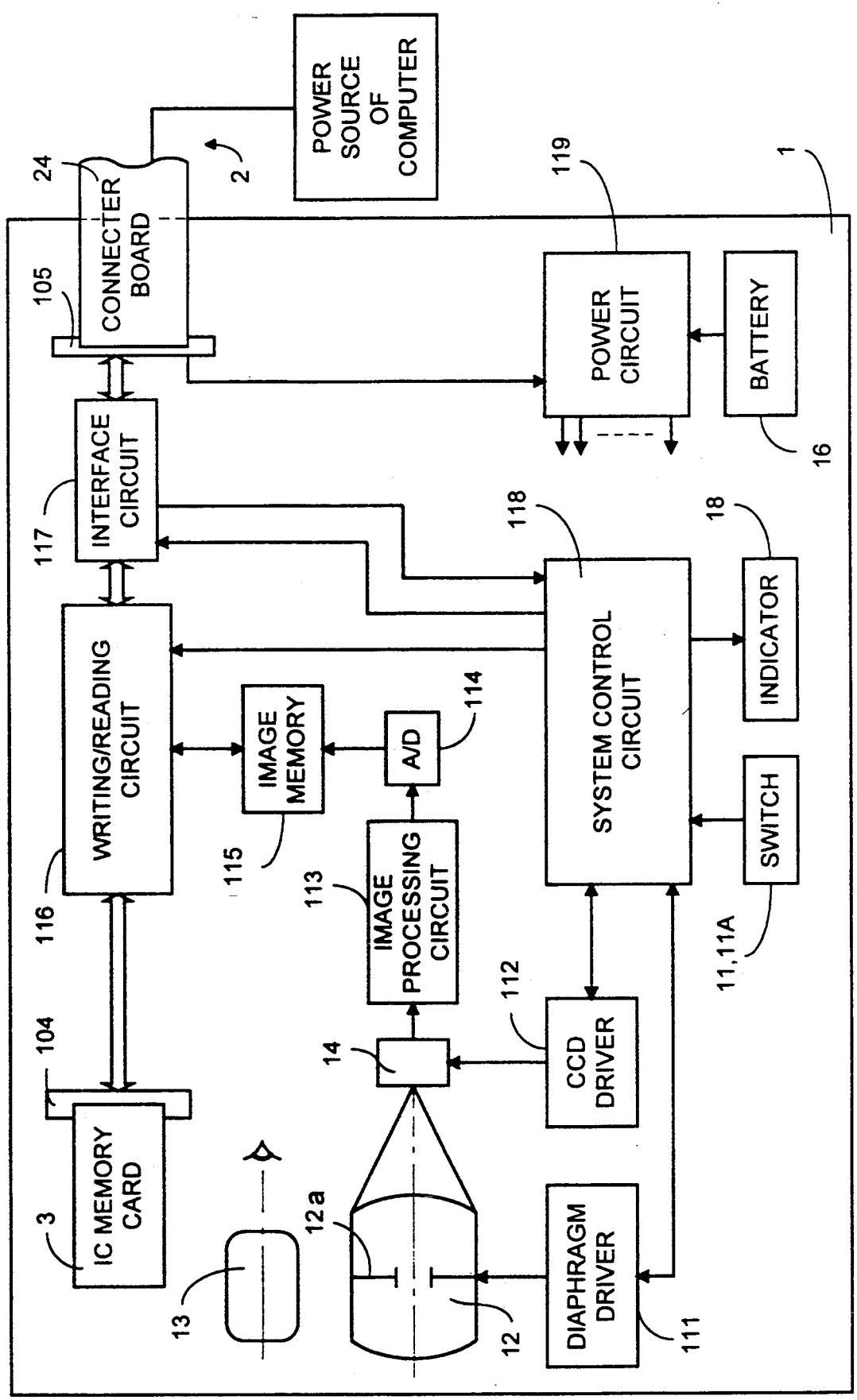
FIG. 3 is a block diagram of an electronic camera shown in FIG. 1.

FIG. 3 shows a block diagram of camera 1. The image taking optical system (lens system) 12 having a fixed focus has a diaphragm 12a whose aperture is automatically controlled by a diaphragm driver 111 to obtain an optimum quantity of light. The automatic diaphragm control mechanism is per se known.

The photographed image is converted to electrical signals by the CCD 14, which is driven by a CCD driver 112, and is detected as image data. The image data thus obtained is processed by an image processing circuit 113 and fed to the image memory 115, comprised of a RAM etc., through an A/D converter 114. The stored image data is written by the writing/reading circuit 116 onto the IC memory card 3 inserted in the card opening 102 and connected to the first connector 104 of the camera 1. The image data recorded on the IC memory card can be read out by the writing/reading circuit 116 into the image memory 115.

The writing/reading circuit 116 is connected to an interface circuit 117 which is connected to the second connector 105 of the camera 1. The interface circuit 117 interconnects the personal computer 2 and the camera 1 through the second connector 105 and the connector board 24 of the personal computer 2 which is connected to the second connector 105. The interface circuit 117 electrically detects the connection of the second connector 105 to the connector board 24.

The above-mentioned circuit elements are generally controlled by a system control circuit 118 to which data of the shutter button 11 and other switches 11A, etc., is input. The input data is indicated by the indicator 18. A power circuit 119 is driven by a power supplied from the battery 16. The power circuit 119 is connected to the second connector 105, so that the power circuit 119 can be supplied with the power from the power source 25 of the personal computer 2. Namely, the connector board 24 of the personal computer 2 is connected to the power source 25 of the personal computer 2. Consequently, the power circuit 119 is supplied with power from the battery 16 when the camera 1 is not connected to the personal computer 2. When the camera 1 is connected to the personal computer 2, the power supply to the power circuit 119 from the battery 16 is automatically switched to the power supply from the power source 25 of the personal computer.

The writing/reading circuit 116 writes data onto and reads data from the IC memory card 3 in a predetermined format in accordance with the control signal output from the system control circuit 118. In addition thereto, the writing/reading circuit 116 writes and reads predetermined data onto and from the IC memory card 3 in a predetermined format also in accordance with the control signal output from the personal computer 2 through the interface circuit 117 and the connector board 24 of the personal computer.

In the camera system as described above, a photographer can take a picture in a normal photographing operation, using the camera disconnected from the personal computer. Namely, when the photographer depresses the shutter button 11 while viewing the field of view through the finder optical system 13, an optimum diaphragm for an object to be photographed is automatically obtained by the diaphragm driver 111, so that the object image can be converged and formed on the CCD 14. The CCD 14 is driven by the CCD driver 112 and outputs the image data of the object image to the image processing circuit 113. The processed image data is converted to digital signals by the A/D converter 114 and the digital signals are stored in the image memory 115.

If the IC memory card 3 is inserted in the card opening 102 of the camera 1 when the photographer depresses the record button 11A, the system controller 118 outputs the record signal to the writing/reading circuit 116 to thereby record the image data stored in the image memory 115 onto the IC memory card 3 in a predetermined format. It is possible to selectively compress the data to be recorded.

Figure 4:
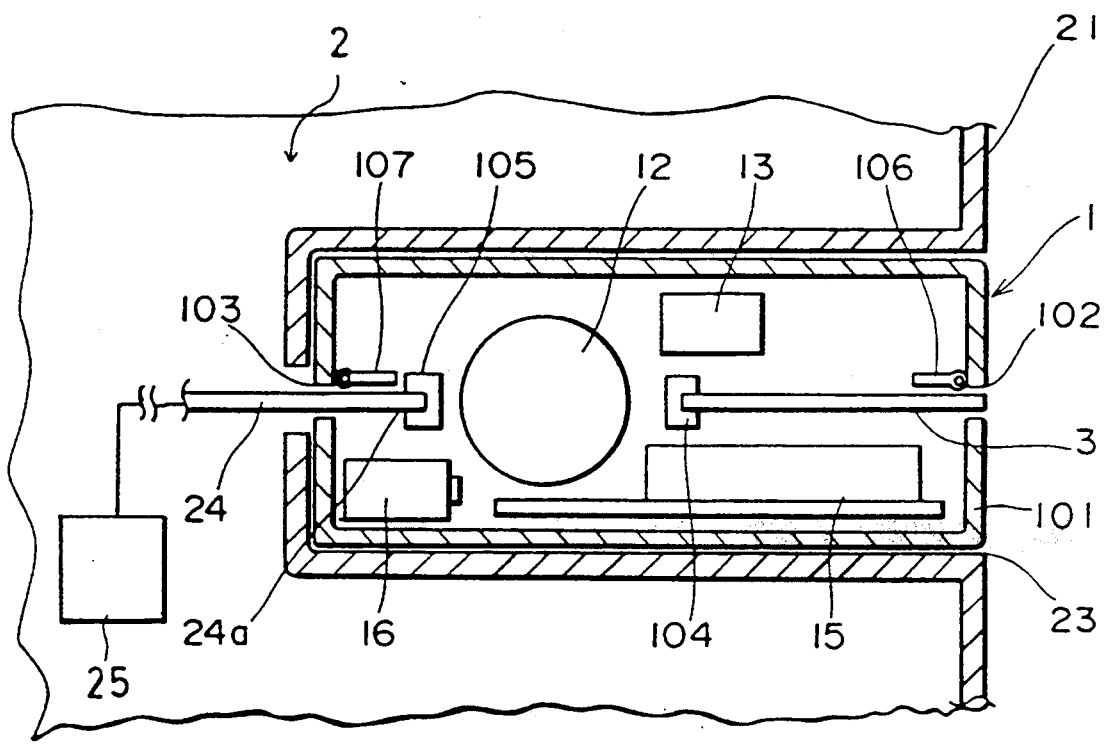
FIG. 4 is a sectional view of an electronic camera connected to a personal computer, according to the present invention; and, FIG. 5 is a schematic front elevational view of an IC memory card.

When the camera 1 is inserted in the recess 23 of the personal computer 2, so that the electrical connection is established between the camera 1 and the personal computer 2, data can be written into the IC memory card 3 or the image data recorded on the IC memory card can be read out therefrom by the operation of the personal computer 2. In FIG. 4, in which the camera 1 is fitted in the recess (connector portion) 23 of the personal computer 2, the second connector 105 of the camera 1 is electrically connected to the connector board 24 which is provided on the inner bottom of the recess 23 to project into the camera 1 through the connector opening 103 of the camera 1. Consequently, the connector 24a of the connector board 24 is electrically connected to the second connector 105 of the camera 1. The connector board 24 is connected with an internal circuit of the personal computer through the input/output circuit thereof (not shown).

Consequently, the IC memory card 3 inserted in the camera 1 is also electrically connected to the connector board 24 through the writing/reading circuit 116 and the interface circuit 117. In this state, the interface circuit 117 outputs a detection signal that indicates the connection of the camera 1 and the personal computer 2 into the system controller 118. Consequently, the system controller 118 stops the photographing operation of the camera 1. As a result, the power circuit 119 is supplied with power from the power source 25 of the personal computer 2 through the second connector 105 and, accordingly, all the operations of the camera are driven by the power source 25 of the personal computer 2, thus resulting in a reduction of the power consumption of the battery 16 of the camera 1.

Control signals including a command signal are sent from the personal computer 2 to the writing/reading circuit 116 through the interface circuit 117 to drive the writing/reading circuit 116 in accordance with the control signals. Accordingly, file data or other numerical data, etc., from the personal computer 2 can be written into the IC memory card 3, or the recorded data of the IC memory card 3 can be read and displayed as graphic data in the display 22 of the personal computer 2.

For example, the image data displayed in the display 22 of the personal computer 2 can be altered or new data added thereto, and then the rewritten data can again be recorded again in the IC memory card, or the recorded image data can be renewed.

As can be seen from the above discussion, according to the present invention, when the camera 1 is connected to the personal computer 2, the data of the personal computer can be written into the IC memory card 3 or the recorded data of the IC memory card can be read therefrom by the personal computer through the writing/reading circuit 116 and the interface circuit 117 of the camera. Accordingly, it is not necessary to provide an additional or special writing/reading circuit in the personal computer to write and read data into and from the IC memory card. This prevents the personal computer from being complicated. It is also unnecessary to provide an RS232C or SCSI interface, etc., to connect the camera and the personal computer.

If the personal computer is a type that is provided with an attaching portion for a hard disc, it is possible to attach the camera 1 to the attaching portion of the personal computer to electrically connect the camera to the personal computer. This may require a slight design modification of the attaching portion in shape or an appropriate adaptor to correspond to the camera. The connector portion of the personal computer is not limited to the recess 23 in which the whole camera is received, as disclosed in the illustrated embodiment. The connector portion can be any connector which can establish an electrical connection between the connector board 24 of the personal computer and the second connector of the camera 1.

Note that once the camera is connected to the personal computer, the camera can no longer take a picture. However, this is not a serious problem because no one usually uses both the personal computer and the camera at the same time.

As can be understood from the foregoing, according to the present invention, since the electronic camera system is comprised of a camera having a writing/reading circuit for reading and writing data from and onto an IC memory card, and an interface circuit for connecting the camera and an external device (i.e., personal computer), and a computer having a connector portion to be connected to the camera, so that when the camera is attached to the computer, the computer is electrically connected to the camera through the writing/reading circuit and the interface circuit, the writing and reading of data onto and from the IC memory card can be carried out on the computer side without providing an additional data writing/reading circuit in the computer. Consequently, it is neither necessary to make the computer expensive nor complicated. Furthermore, a special connector or interface is not necessary to connect the computer and the camera, thus resulting in a realization of a simple, inexpensive and compact electronic camera system.

I claim:

1. An electronic camera system comprising:
    a camera utilizing an IC memory card in which image data of an object to be photographed can be stored, said camera comprising: means for receiving said IC memory card and to electrically connect therewith, a data writing/reading circuit which writes and reads data onto and from said IC memory card connected to said IC memory card receiving means, a computer interface circuit connected to said data writing/reading circuit, and a means connected to said interface circuit for electrically connecting said camera to an associated computer; and,
    a computer including a recess defined therein into which said camera may be completely inserted, said computer recess having a means for electrical connection to said electrically connecting means of said camera when said camera is inserted into said computer recess whereby when said camera is inserted into said recess, said computer is electrically connected to said IC memory card through said data writing/reading circuit and said interface circuit when said connecting means of said camera is connected to said connecting means of said computer.

2. The electronic camera system of claim 1, further comprising:
    a means for stopping a photographing operation of said camera when said connecting means of said camera is connected to said connecting means of said computer.

3. The electronic camera system of claim 1 further comprising:
    independent power sources in said camera and said computer.

4. The electronic camera system of claim 3, further comprising:
    a switching means provided in said camera for switching a source of camera power from said camera power source to said computer power source when said connecting means of said camera is connected to said connecting means of said computer.

5. The electronic camera system of claim 1, wherein said IC memory card is detachably attached to said camera.

6. The electronic camera system of claim 1, wherein said connecting means of said computer comprises a connector board, and wherein said connecting means of said camera comprises a connector to be connected to said connector board.

7. The electronic camera system of claim 6, wherein said connector board projects from inside said computer into a bottom portion of said recess.

8. The electronic camera system of claim 1, further comprising:
an input means provided in said computer for inputting data other than said image data into said IC memory card.

9. The electronic camera system of claim 1, wherein said camera is a still video camera.

10. An electronic camera system comprising:
a camera in which image data can be stored in an IC memory card; and,
a computer which can write data other than said image data onto said IC memory card and read said image data recorded on said IC memory card, said computer being provided with a recess into which said camera may be completely inserted;
said camera being provided with a data writing/reading circuit which writes and reads data onto and from said IC memory card, and an interface circuit for said computer;
said computer being provided with a connector which, when said camera is inserted into said recess is electrically connected to said camera, so that said computer and said IC memory card are connected through said data reading/writing circuit and said interface circuit.

11. The electronic camera system of claim 10, wherein said camera is a still video camera.

* * * * *